United States Patent
Schoenfeldt et al.

(10) Patent No.: US 10,914,612 B2
(45) Date of Patent: Feb. 9, 2021

(54) INDEXED OPTICAL ENCODER

(71) Applicant: FARO Technologies, Inc., Lake Mary, FL (US)

(72) Inventors: William E. Schoenfeldt, Oviedo, FL (US); Jeremy Mares, Lake Mary, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 87 days.

(21) Appl. No.: 16/247,800

(22) Filed: Jan. 15, 2019

(65) Prior Publication Data

US 2019/0234770 A1    Aug. 1, 2019

Related U.S. Application Data

(60) Provisional application No. 62/623,136, filed on Jan. 29, 2018.

(51) Int. Cl.
*G01D 5/245*  (2006.01)
*G01D 5/347*  (2006.01)
(Continued)

(52) U.S. Cl.
CPC ....... *G01D 5/2457* (2013.01); *G01D 5/24476* (2013.01); *G01D 5/3473* (2013.01);
(Continued)

(58) Field of Classification Search
CPC ... G01D 5/2457; G01D 5/2495; G01D 5/2497
See application file for complete search history.

(56) References Cited

U.S. PATENT DOCUMENTS

| 4,794,251 A | 12/1988 | Scholian |
| 6,246,468 B1 | 6/2001 | Dimsdale |

(Continued)

FOREIGN PATENT DOCUMENTS

| DE | 102009035336 A1 | 11/2010 |
| DE | 102012109481 A1 | 4/2014 |
| WO | 20160174517 A1 | 11/2016 |

OTHER PUBLICATIONS

European Search Report for Application No. 19153915.4 dated Jun. 21, 2019; 8 pgs.

(Continued)

*Primary Examiner* — Thanh Luu
(74) *Attorney, Agent, or Firm* — Cantor Colburn LLP

(57) ABSTRACT

Optical encoders and methods of determining rotational movement are provided. The optical encoders include an encoder disk having a patterned signal track comprising a plurality of optically detectable elements disposed on a periphery of the encoder disk, wherein each optically detectable element is associated with a bit in a binary sequence, wherein each bit has a predefined bit depth, a boundary dividing the patterned signal track into at least two sub-regions, wherein each sub-region comprises a subset of the optically detectable elements, at least one sensor arranged to detect an optical signal associated with at least one optically detectable element, and a controller in communication with the at least one sensor, the controller configured to determine an angular position of the encoder disk, wherein the controller determines the angular position based on a detected binary sequence, a detected sub-region, and a look-up-table.

20 Claims, 5 Drawing Sheets

(51) Int. Cl.
  *G01D 5/38* (2006.01)
  *G01D 5/244* (2006.01)

(52) U.S. Cl.
  CPC ..... *G01D 5/34715* (2013.01); *G01D 5/34792* (2013.01); *G01D 5/38* (2013.01)

(56) References Cited

U.S. PATENT DOCUMENTS

| | | |
|---|---|---|
| 6,683,543 B1 | 1/2004 | Yeo |
| 7,069,124 B1 | 6/2006 | Whittaker et al. |
| 8,476,579 B2 | 7/2013 | York |
| 8,705,012 B2 | 4/2014 | Greiner et al. |
| 8,705,016 B2 | 4/2014 | Schumann et al. |
| 8,811,767 B2 | 8/2014 | Veeraraghavan et al. |
| 10,082,409 B2 | 9/2018 | Jordil et al. |
| 2010/0213358 A1 | 8/2010 | Chang |
| 2011/0112786 A1 | 5/2011 | Desforges et al. |
| 2011/0128531 A1* | 6/2011 | Al-Rawi .............. G01D 5/3473 356/139 |
| 2011/0282622 A1 | 11/2011 | Canter |
| 2011/0288684 A1 | 11/2011 | Farlow et al. |
| 2012/0069352 A1 | 3/2012 | Ossig et al. |

OTHER PUBLICATIONS

Brenneke et al: "Using 3D laser range data for slam in outdoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.

* cited by examiner

INDEXED OPTICAL ENCODER

CROSS REFERENCE TO RELATED APPLICATIONS

This application claims the benefit of an earlier filing date from U.S. Provisional Application Ser. No. 62/623,136, filed Jan. 29, 2018, the entire disclosure of which is incorporated herein by reference.

BACKGROUND OF THE INVENTION

The subject matter disclosed herein relates to an optical encoder and an optical encoder with a plurality of index markings.

Optical encoders are devices that may be used for measuring angular displacement. Typically these devices detect movement in an illumination pattern that is imposed by an optical encoder disk by mechanisms such as diffraction, selective transmission, selective reflection, etc. High accuracy is often a requirement for these devices. Many conventional devices have problems that limit their accuracy, reliability, calibration, and/or ease of mass production. They are generally expensive when fine resolution is required.

In some applications it is desirable to not only measure the amount of rotation, but also the orientation or angular position of the encoder relative to a home or zero position. To determine the orientation, some optical encoders have used an index mark that may be detected by an optical sensor. The index mark in combination with the fringe pattern allows for the determination of both the amount of rotation and the orientation/position of the optical encoder. Since the orientation may not be initially known, the optical encoder may have to be rotated to allow the detection and registration of an index mark. It should be appreciated that, typically, the registration of the index mark requires less than one rotation of the optical encoder.

Accordingly, while existing optical encoders are suitable for their intended purposes the need for improvement remains, particularly in providing an optical encoder that improves and reduces the time for registering the orientation of the optical encoder.

BRIEF DESCRIPTION OF THE INVENTION

According to aspects of the present disclosure, optical encoders are provided. The optical encoders include an encoder disk having a patterned signal track comprising a plurality of optically detectable elements disposed on a periphery of the encoder disk, wherein each optically detectable element is associated with a bit in a binary sequence, wherein each bit has a predefined bit depth, a boundary dividing the patterned signal track into at least two sub-regions, wherein each sub-region comprises a subset of the optically detectable elements, at least one sensor arranged to detect an optical signal associated with at least one optically detectable element, and a controller in communication with the at least one sensor, the controller configured to determine an angular position of the encoder disk, wherein the controller determines the angular position based on a detected binary sequence, a detected sub-region, and a look-up-table.

In addition to one or more of the features described herein, or as an alternative, further embodiments of the optical encoders may include that the encoder disk comprises a plurality of boundaries defining a plurality of sub-regions of equal arc-length such that an equal number of optically detectable elements is located in each sub-region.

In addition to one or more of the features described herein, or as an alternative, further embodiments of the optical encoders may include that the encoder disk comprises a plurality of boundaries defining a plurality of sub-regions, such that at least two of the sub-regions have different arc-lengths.

In addition to one or more of the features described herein, or as an alternative, further embodiments of the optical encoders may include that each sub-region comprises an identical set of optically detectable elements.

In addition to one or more of the features described herein, or as an alternative, further embodiments of the optical encoders may include that the boundary is identifiable by the at least one sensor to indicate a sub-region.

In addition to one or more of the features described herein, or as an alternative, further embodiments of the optical encoders may include that the at least one sensor comprises a first sensor configured to detect an optically detectable element of the patterned signal track and a second sensor configured to detect a sub-region.

In addition to one or more of the features described herein, or as an alternative, further embodiments of the optical encoders may include that the first sensor is a linear sensor and the second sensor is an optical sensor.

In addition to one or more of the features described herein, or as an alternative, further embodiments of the optical encoders may include that the predefined bit depth is at least 5 bits.

In addition to one or more of the features described herein, or as an alternative, further embodiments of the optical encoders may include an index track arranged on the encoder disk, wherein the index track enables detection of a specific sub-region.

In addition to one or more of the features described herein, or as an alternative, further embodiments of the optical encoders may include a plurality of radial markings, wherein a radial marking identifies a specific sub-region.

In addition to one or more of the features described herein, or as an alternative, further embodiments of the optical encoders may include that the radial markings are superimposed on the patterned signal track.

In addition to one or more of the features described herein, or as an alternative, further embodiments of the optical encoders may include that each radial marking associated with a specific sub-region is different from the other radial markings.

In addition to one or more of the features described herein, or as an alternative, further embodiments of the optical encoders may include that the optically detectable elements of the patterned signal track are tangentially-patterned pseudorandom binary sequences.

According to some aspects of the present disclosure, methods for determining rotational movement are provided. The methods include rotating an encoder disk having a patterned signal track comprising a plurality of optically detectable elements disposed on a periphery of the encoder disk, wherein each optically detectable element is associated with a bit in a binary sequence, wherein each bit has a predefined bit depth, the encoder disk further having a boundary dividing the patterned signal track into at least two sub-regions, wherein each sub-region comprises a subset of the optically detectable elements, detecting a sub-region of the rotating encoder disk, detecting an optical signal associated with at least one optically detectable element of the patterned signal track, and determining, using a controller, an angular position of the encoder disk based on a detected binary sequence, a detected sub-region, and a look-up-table.

In addition to one or more of the features described herein, or as an alternative, further embodiments of the methods may include illuminating the encoder disk with light and detecting the light diffracted, as patterned by at least one of selective transmission, reflection, or diffractive phenomena, with a sensor to determine the sub-region and the optical signal associated with at least one optically detectable element of the patterned signal track.

In addition to one or more of the features described herein, or as an alternative, further embodiments of the methods may include that the encoder disk comprises a plurality of boundaries defining a plurality of sub-regions of equal arc-length such that an equal number of optically detectable elements is located in each sub-region.

In addition to one or more of the features described herein, or as an alternative, further embodiments of the methods may include that the encoder disk comprises a plurality of boundaries defining a plurality of sub-regions, such that at least two of the sub-regions have different arc-lengths.

In addition to one or more of the features described herein, or as an alternative, further embodiments of the methods may include that each sub-region comprises an identical set of optically detectable elements.

In addition to one or more of the features described herein, or as an alternative, further embodiments of the methods may include that the predefined bit depth is at least 5 bits.

In addition to one or more of the features described herein, or as an alternative, further embodiments of the methods may include a plurality of radial markings, wherein a radial marking identifies a specific sub-region.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present disclosure described herein can provide advantages associated with optical encoders for measuring rotational motion. Various embodiments provide advantages associated with reducing the size of look-up-tables and/or improving efficiencies related to processing steps associated with determining rotational position during use of optical encoders. Embodiments provide still further advantages in improving the reliability and robustness of the optical encoder by providing multiple registration locations. Furthermore, embodiments provided herein are directed to increasing bit depths which can be advantageous for use with larger encoder disk sizes. This is because, as the bit depth increases, the size of each individual bit becomes necessarily smaller (where bit size is, as will be appreciated by those of skill in the art, approximately circumference/(2N−1)). Therefore, for small encoder disks, a practical limit on bit depth may be 12 or 14 bits, but the maximum limit increases with disk size.

Figure 1:
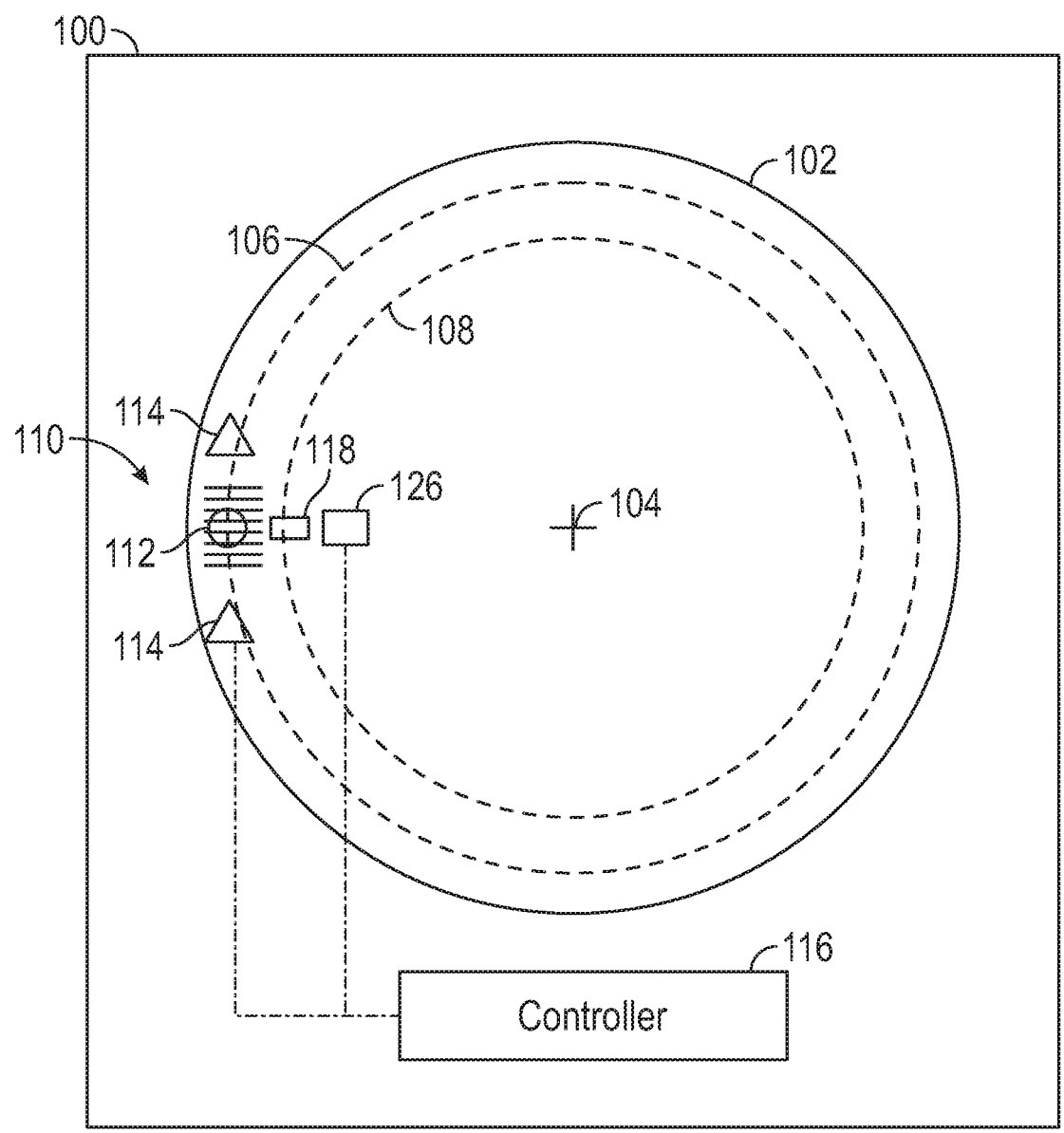
FIG. 1 is a schematic illustration of an optical encoder disk in accordance with an embodiment of the present disclosure.
Figure 2:
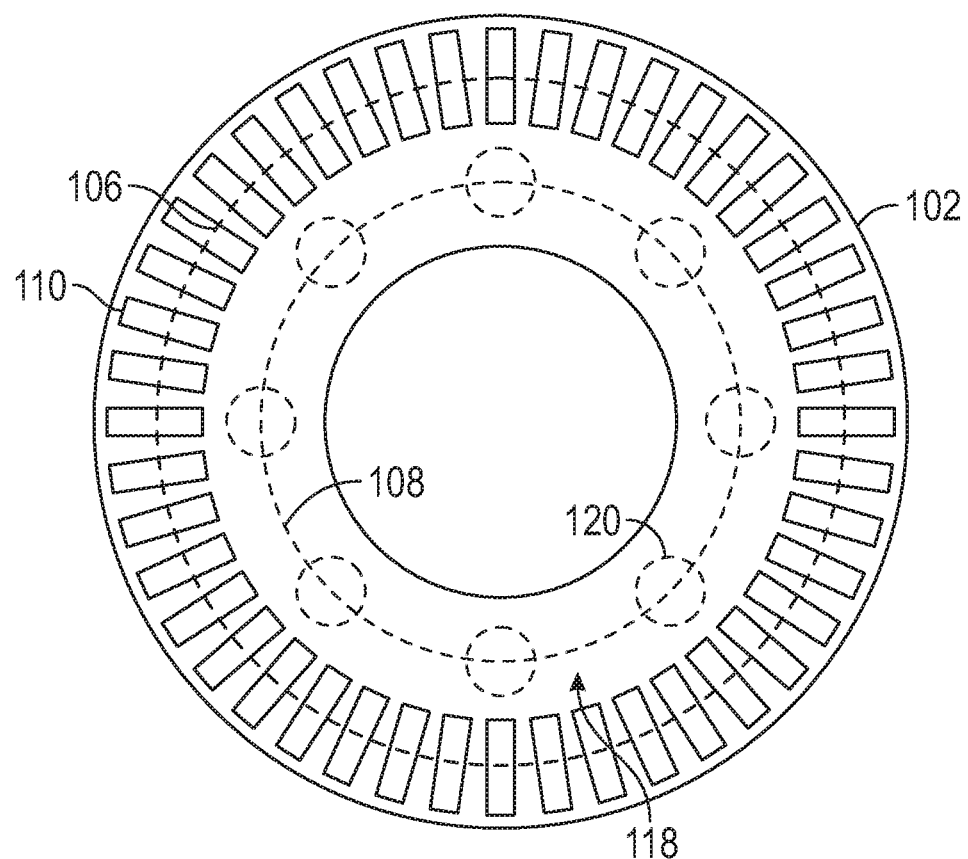
FIG. 2 is a schematic view illustrating details of the optical encoder of FIG. 1.
Figure 3:
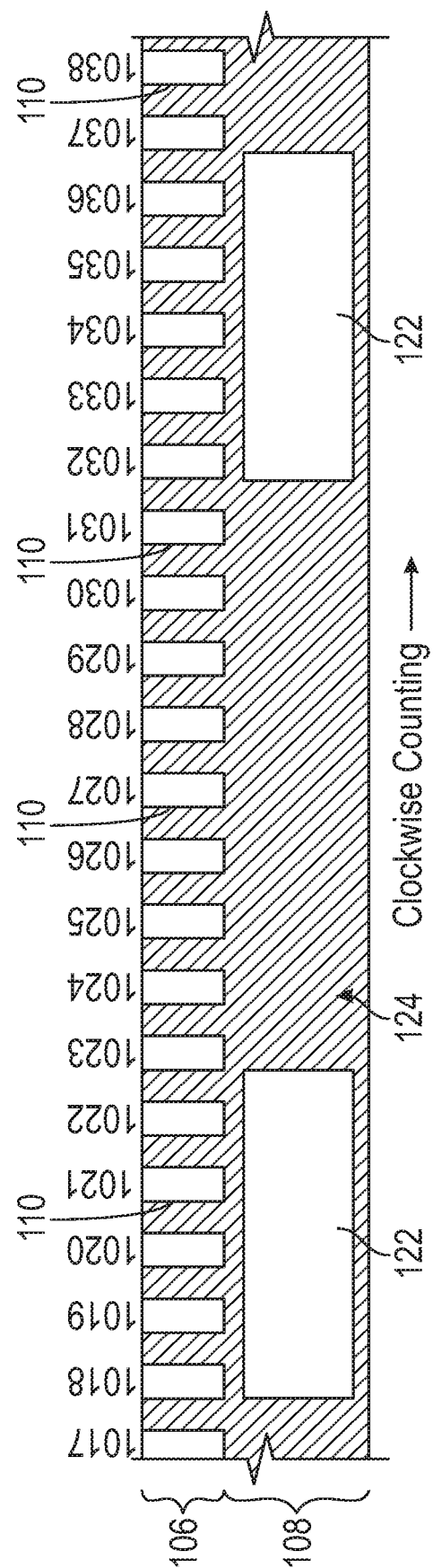
FIG. 3 is an illustration of a pattern of index sequences that may be used in the optical encoder of embodiments of the present disclosure.

Referring now to FIGS. 1-3, an optical encoder 100 that can incorporate embodiment of the present disclosure is schematically shown. The optical encoder 100 includes an encoder disk 102 that is rotatable about an axis 104. The encoder disk 102 includes a signal track 106 and an index track 108. The encoder disk 102, in some embodiments, can be formed from a circular piece of glass with a series of equally spaced lines arranged on the signal track 106, thus forming a diffraction grating 110. The diffraction grating 110 can be illuminated using a light source to create an alternating pattern of light/dark lines which are detectable by one or more sensors, as described herein. The encoder disk 102 has a disk count that is defined by the number of light/dark pairs of the diffraction grating 110 generated by a light interacting with lines of the diffraction grating 110. The disk count is based on a single revolution of the encoder disk 102. As used herein, a pitch of the diffraction grating 110 refers to a distance between each line of the diffraction grating 110 of the signal track 106.

When the encoder disk 102 is illuminated, such as by a light source 112, the diffraction grating 110 can generate a fringe pattern that is detectable by one or more sensors 114, such as photodetectors or similar optical/light sensors. In some embodiments, such as shown in FIG. 1, the sensors 114 include a pair of sensors arranged on either side of the light source 112. The pair of sensors 114 are arranged to detect a fringe pattern generated by light from the light source 112 interacting with the diffraction grating 110. When multiple sensors 114 are employed, the various sensor elements can be offset. For example, in one non-limiting embodiment, the offset of the sensors 114 may be arranged at a ¼ pitch offset.

As the encoder disk 102 is rotated, the fringe pattern is detected by the sensor(s) 114. The processing of the fringe pattern by the sensors 114 can be output as a quadrature signal pair, which is described in commonly owned U.S. Pat. No. 8,476,579, the contents of which are incorporated by reference herein. Those of skill in the art will appreciate that the quadrature signal pair allows the direction and magnitude of rotation to be determined by a processor element (such as a counter). In the non-limiting example shown in FIG. 1, a processor element/counter is provided as a module within a controller 116. The controller 116, as shown, is also electrically coupled to the sensor(s) 114 and light source 112, and can control output of the light source 112 and detection operation by the sensor(s) 114.

As shown in FIGS. 1-2, the index track 108 is arranged radially inward from the signal track 106. As will be appreciated by those of skill in the art, the index track 108 can include a pattern 118 of index markers 120. The index markers 120 of the pattern 118 can form a pre-defined sequence. Each of the index markers 120 can be unique relative to the other index markers 120 of the pattern 118. As such, the index markers 120 can be used as an indexing feature on the encoder disk 102. Because each of the index markers 120 is identifiable relative to the other index markers 120, an orientation and/or angular position may be registered relatively quickly with little rotational movement of the encoder disk 102. In some embodiments, one of the index markers 120 can be designated as a "zero" reference position. In some embodiments, the pattern 118 may be a tangentially-patterned pseudorandom binary sequences to indicate position. In such patterns 118 the angular position is indicated/labeled by a binary sequence that varies over the full angular range of motion (0-360 degrees, commonly) of the encoder disk 102.

Those of skill in the art will appreciate that the optical encoder 100 and parts thereof (e.g., the signal track 106 and index track 108) may be formed using known techniques. For example, in some non-limiting embodiments, layers of chrome can be applied to the encoder disk 102 to form a reflective surface and with marks for the signal track 106 and index track 108 achieved by blackening or darkening the glass of the encoder disk 102. For example, with reference to FIG. 3, the signal track 106 and index track 108 include non-reflective portions 124 (the diffraction grating 110 and the index markers 120 being reflective portions 122), with the reflective portions 122 achieved by the application of flat black paint to the encoder disk 102. Those of skill in the art will appreciate that the term "non-reflective" does not require a surface to have 0% reflectivity. For example, in some embodiments, a surface may have low reflectivity, such as a reflectivity of 5% or less.

In operation, light from light source 112 reflects off of the index track 108 and is received by an optical detector 126, shown in FIG. 1. The optical detector 126 may be any suitable optical detector that outputs a signal, such as a voltage, in response to the light detected at the optical detector 126. Such light detection can be based on the index markers 120 moving through the field of view of the optical detector 126. The optical detector 126 has an associated detection area, which captures the light reflected from an index mark 120 located on a surface of the encoder disk 102.

The signal output from the optical detector 126 is transmitted to the controller 116. The controller 116 can be a suitable electronic device capable of, for example, accepting data and instructions, executing the instructions to process the data, and presenting the results. The controller 116 may be or may include a microprocessor and memory (e.g. RAM or ROM) for example. In some embodiments, the controller 116 may be an ASIC (application specific integrated circuit) or an analog circuit. Further, in some embodiments, the controller 116 may be co-located adjacent the encoder disk 102, may be remotely located from the encoder disk 102, and/or the functionality described herein may be incorporated into a controller for the equipment the optical encoder 100 is measuring, such as, for example, an articulated arm coordinate measurement machine (AACMM) or a laser tracker.

Controller 116 is capable of converting an analog voltage or current level provided by the optical detector 126 into a digital signal indicative of the amount of light reflected from the index track 108. In some embodiments, the optical detector 126 may be configured to provide a digital signal to the controller 116, or an analog-to-digital (A/D) converter (not shown) may be coupled between the optical detector 126 and the controller 116 to convert the analog signal provided by the optical detector 126 into a digital signal for processing by the controller 116. The controller 116 can be configured to receive and operate using the digital signals to act as input to various processes for determining the amount of rotation and resolve the rotational orientation of the encoder disk 102.

It should be appreciated that the controller 116 may include communications circuits (not shown) that allow the controller 116 to transmit signals via data transmission media (not shown) to other remote controllers or computers. In one non-limiting embodiment, signals and/or data from the controller 116 are transmitted to a controller of an AACMM and are used for determining the rotation of an arm segment and in the determination of three-dimensional coordinates of points on an object.

In existing encoder solutions that utilize tangentially-patterned pseudorandom binary sequences to indicate position, the angular position is indicated/labeled by a binary sequence that varies over the full angular range of motion (0-360 degrees, commonly) of the encoder. In some systems, to facilitate angular measurement, a look-up table can be employed (e.g., by the controller 116) to convert the pseudorandom binary pattern to angular position. In other arrangement, the controller 116 can be configured to perform an iterative calculation that is made with each measurement that relates the measured binary pattern to a 'zero' position. Such systems can be implemented, for example, by a linear feedback shift register (LFSR).

In the above described pseudorandom binary pattern systems, as will be appreciated by those of skill in the art, the computational or memory resources needed by the controller 116 will scale with increasing bit depth. For example, if the bit depth is 8-bit, there must either be a look-up table with $2^8-1$ entries, or alternatively, position can be back-calculated to zero by using up to $2^8-1$ iterations. Therefore, as the bit depth grows, either the look-up table size must grow accordingly, or the number of possible iterations to back-calculate position must grow. However, larger bit depths are desirable to permit improved angular resolution. While this issue does not present a challenge for modest bit depths, as the bit depth increases, the resources required quickly grow to impractical levels. For example, a 32-bit pseudorandom pattern would require a look-up table with approximately 4.3 billion entries, which is currently unrealistic for most systems. Non-limiting embodiments provided herein are directed to bit depths of five bits or more. For example, in some embodiments, the predefined bit depth can be 5-bit, 6-bit, 12-bit, etc.

Embodiments provided herein are directed to enabling improved angular resolution/detection while maintaining relatively small look-up tables (i.e., minimize bit depth). Some non-limiting embodiments provided herein are directed to subdividing a full angular range of motion into two or more sub-regions that can permit a lesser bit depth to be used. The sub-regions enable bit-depth to be used only over an angular subtense of the sub-region (where the angular span of 360 degrees may be divided into multiple sub-regions). For example, by identifying which sub-region of a set of sub-regions a reading is made, specific angular position data can be less at a point as each point represents only a portion (subtense) of an encoder disk.

In one non-limiting embodiment, an absolute or pseudo-absolute rotary/angular encoder has a pattern on the periphery of the encoder disk. The pattern is subdivided into multiple sub-regions, (which may be of equal or varying angular subtense). The sub-regions enable a reduction in the size of a look-up table associated with the encoder, the look-up table enabling the derivation of an angular position of the encoder disk. Embodiments provided herein may yield advantages in both speed (due to smaller look-up tables) and in reduced computational resources used due to the ability of use pseudorandom binary patterns of reduced bit depth (i.e., shorter binary sequences) to indicate position.

Figure 4:
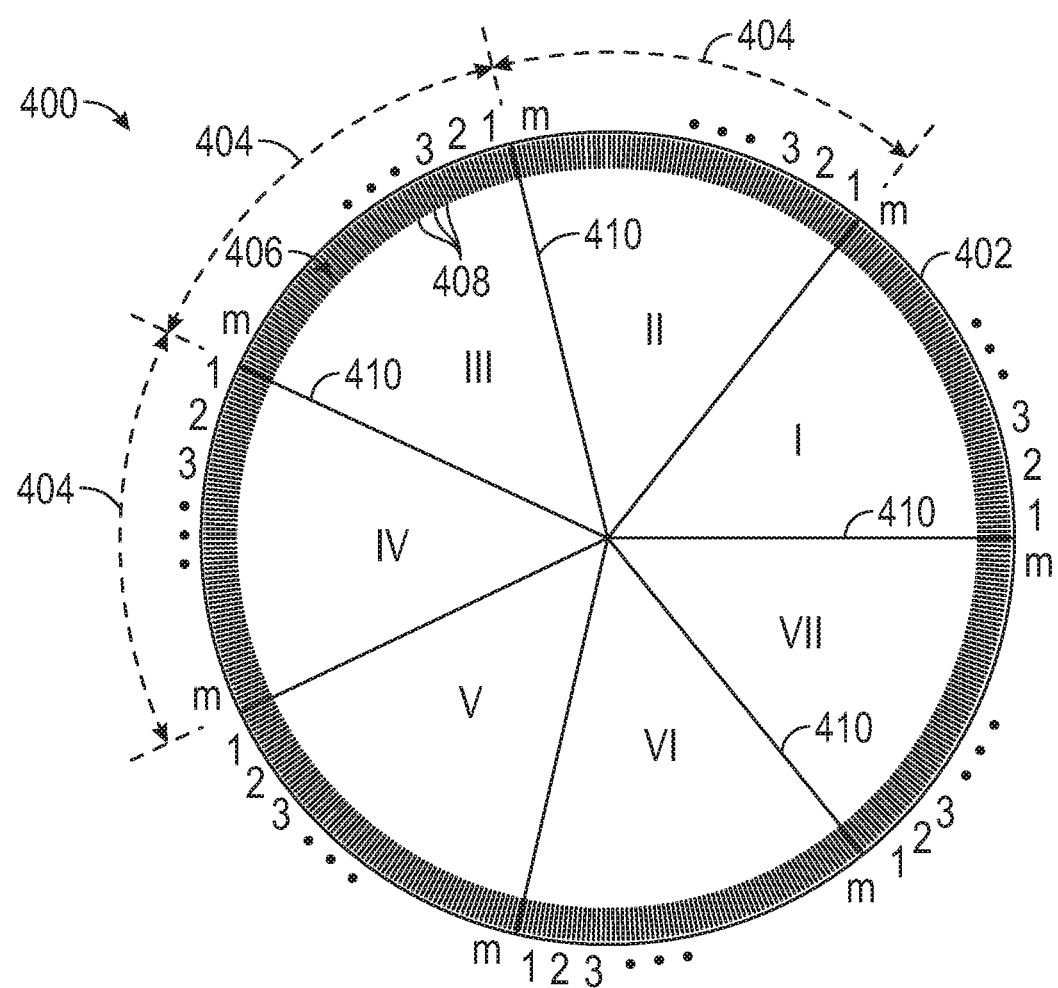
FIG. 4 is a schematic illustration of an optical encoder disk in accordance with an embodiment of the present disclosure.

Turning now to FIG. 4, a schematic illustration of an optical encoder 400 in accordance with an embodiment of the present disclosure is shown. FIG. 4 is an illustrative diagram of an absolute/pseudo-absolute rotary encoder with a full range of motion, (i.e., 0-360 degrees). As shown in FIG. 4, the full range of motion of an encoder disk 402 subdivided into multiple sub-regions 404. The encoder disk 402 includes a patterned signal track 406 formed of a plurality of optically detectable elements 408, such as shown and described above.

In the embodiment shown in FIG. 4, the signal track 406 of the encoder disk 402 is separated into seven distinct sub-regions 404 (labeled I, II, III, IV, V, VI, VII). Each sub-region 404 is patterned with a pseudorandom pattern of optically detectable elements 408 that repeats at boundaries 410 between adjacent sub-regions 404. That is, in this embodiment, each sub-region 404 (I, II, III, IV, V, VI, VII) comprises the same or similar pseudorandom pattern that repeats for each sub-region 404, with a pattern-restart occurring at the boundaries 410. Each of the sub-regions 404 has a binary pattern at the perimeter which labels positions ranging from 1 to m, as illustratively shown. The repeating pattern at the boundaries 410 is illustratively labeled with a "1" of one sub-region (sub-region III) adjacent an "m" of an adjacent sub-region (sub-region II) at a boundary 410. Although shown in FIG. 4 with seven sub-regions 404, any number of sub-regions (two or more) can be employed without departing from the scope of the present disclosure.

In accordance with the present disclosure, in a multi-period absolute or pseudo-absolute optical encoder, the underlying principal is that the full range of angular motion (e.g., 360 degrees) is subdivided into the multiple sub-regions 404. Each of these sub-regions 404 comprises a portion of the full range of angular motion and is labeled at its periphery with a pseudorandom binary pattern of optically detectable elements 408.

In some embodiments, the encoder disk is divided into sub-regions of equal angular subtense (e.g., 360°/N for N regions). In some embodiments, each of the equal angular subtense regions may be identically labeled with pseudo-random binary sequences such that each equal angular subtense sub-region is identical to the other equal angular subtense sub-regions. The periodic nature of the pseudorandom binary sequences (with period 2B−1 for bit depth B) allows the patterns to continue "seamlessly" at boundaries between the sub-regions. Such "seamless" continuity is achieved because there may be no discontinuities in the binary pattern that would yield indeterminate position.

Figure 5:
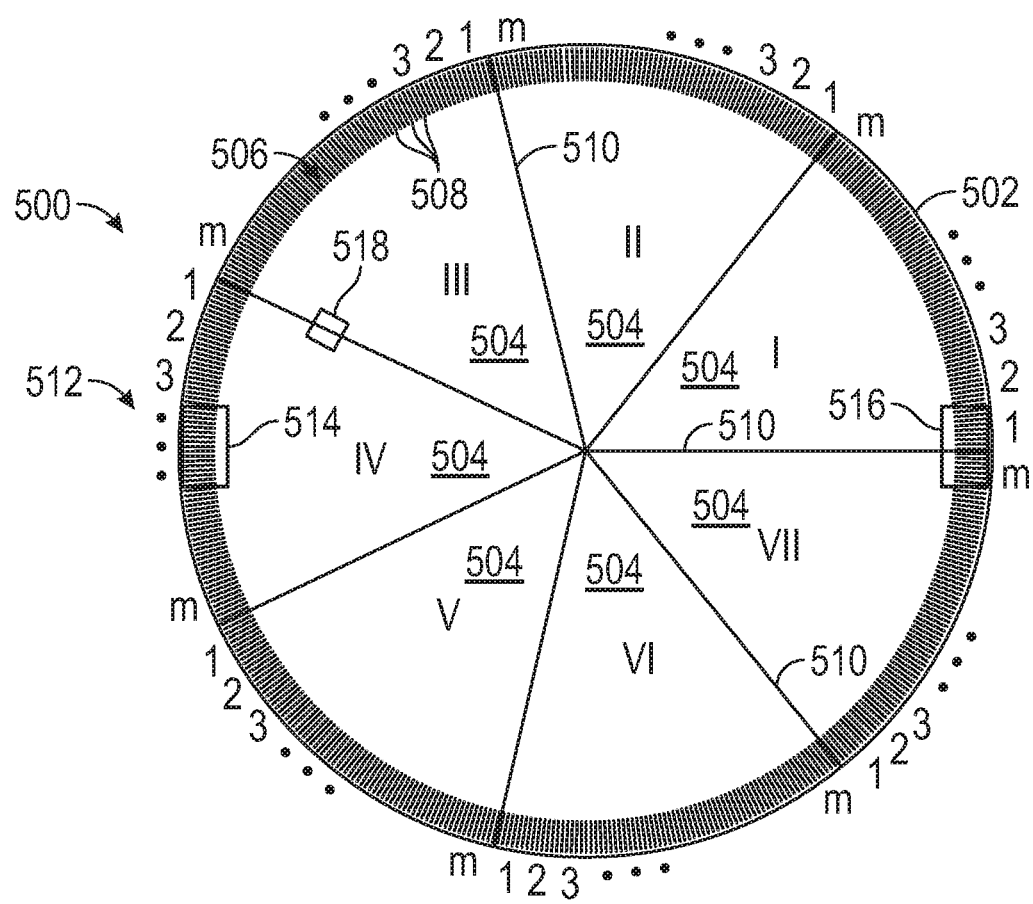
FIG. 5 is a schematic illustration of an optical encoder disk in accordance with an embodiment of the present disclosure.

With reference to FIG. 5, an optical encoder 500 having an encoder disk 502, which is substantially similar to that shown and described with respect to FIG. 4 is shown. However, in this illustration, the optical encoder 500 is shown equipped with a detection system 512. The detection system 512 can be operably connected to a controller (e.g., as shown and described with respect to FIGS. 1-3). In this embodiment, the detection system 512 includes a first position read head 514 and a second position read head 516. In one embodiment, the read heads 514, 516 are spaced 180° apart. The detection system 512 further includes an index sensor 518. The position read heads 514, 516 are configured to read or detect a patterned signal track 506 formed of a plurality of optically detectable elements 508. The optically detectable elements 508 may be arranged in pseudorandom binary sequences that repeat over a plurality of sub-regions 504, similar to that described with respect to FIG. 4.

In some embodiments, the position read heads 514, 516 may be linear detector arrays or image sensors (e.g., charge-coupled (CCD) or complementary metal-oxide-semiconductor (CMOS) devices). Positional information from the sub-regions 504 may be read by the position read heads 514, 516. Although shown with two position read heads, those of skill in the art will appreciate that systems of the present disclosure can be configured with one or more position read heads (or other types of sensors). In an embodiment, the read heads are spaced equi-angular distances apart (e.g. equal arc-lengths apart) about the encoder disk 502. In embodiments with the position read heads 514, 516 configured as linear sensor arrays the sensors may be configured with a narrow field of view (e.g., 1 pixel in width).

In operation, in addition to counting or tracking the optically detectable elements 508 of a signal track 506, the detection system 512 also determines which region is being read in order to determine true absolute angular position. In this particular example, because each sub-region 504 is identical in the pattern of the optically detectable elements 508 (e.g., identical pseudorandom binary sequences) merely detecting one or more optically detectable elements 508 of the signal track 506 will not indicate which sub-region 504 in which the reading is being made. Accordingly, to address this, an additional index sensor 518 is used, as shown. In an embodiment, the index sensor 518 is angularly offset from the read head 514. The index sensor 518 is arranged to operate in a manner akin to incremental sensors as known in the art. For example, the index sensor 518 can be configured to "count" the number of index marks that have been passed from some reference "zero" position. In some such embodiments, one or more boundaries 510 can be labeled with an index mark and/or function as an index mark. Alternatively, each index mark (e.g., the boundaries 510) could be uniquely labeled, indicated, marked, or indexed to eliminate the need to count transits of indices (i.e., each index mark indicates an associated sub-region 504). In some embodiments, the index sensor 518 can be arranged to detect portions of an index track that is configured on the optical encoder 500, as shown and described above with reference to FIGS. 1-3. Accordingly, embodiments provided herein can permit a positional measurement that would be absolute within 360/N degrees (with N sub-regions 504), and would only require rotating the encoder that amount to gain a reference position.

Figure 6:
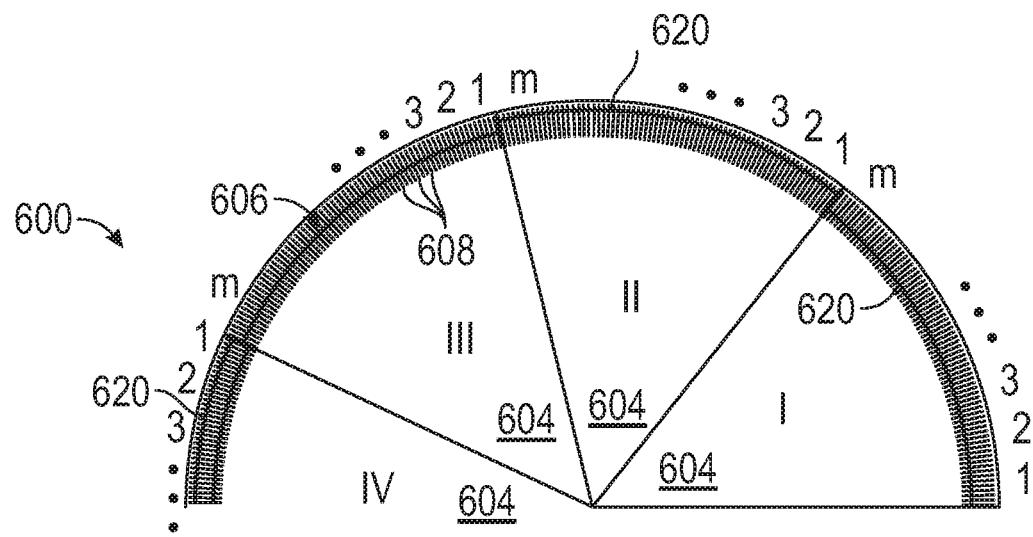
FIG. 6 is a partial schematic illustration of an optical encoder disk in accordance with an embodiment of the present disclosure.

Turning now to FIG. 6, a partial illustration of an optical encoder 600 is shown. The optical encoder 600 may be similar to the optical encoder 500 of FIG. 5. However, in this embodiments, as illustratively shown, a patterned signal track 606 includes a plurality of optically detectable elements 608 and additional radial markings 620. In this arrangement the optically detectable elements 608 of the patterned signal track 606 are arranged as tangential markings and the radial markings 620 are markings that span the circumferential arc-length of each sub-region 604. The radial markings 620 operate as index markers but rather than providing a discrete data point indicating a region or boundary, the radial markings 620 are overlaid or superimposed on the patterned signal track 606. The radials markings 620 (used in conjunction with a sensor, e.g., image sensors, linear sensors, etc.) can permit the determination of which sub-region 604 position read heads are measuring. The radial markings 620 can each comprise a different pattern or marking to indicate a specific sub-region 604. For example, as shown in FIG. 6, one or more arcuate lines or markings can be positioned at different radial positions on the patterned signal track 606, with each arcuate line(s) or marking(s) indicating a specific sub-region 604.

Further, the arrangement shown in the embodiment of FIG. 6 can enable additional information about a given sub-region being encoded radially (i.e., with radial markings 620). In one such configuration, an index sensor (e.g., linear sensor, optical sensor, etc.) can be employed to determine the sub-region 604 that is being detected at any given instance. In some such configurations, the index sensor can be oriented radially, rather than tangentially, to determine the specific sub-region 604.

Although the present disclosure has been made with respect to diffraction, those of skill in the art will appreciate that this is merely an example, and is not to be limiting. For example, various techniques can be employed without departing from the scope of the present disclosure, including, but not limited to light being patterned by selective transmission, reflection, and/or diffractive phenomena.

Advantageously, embodiments provided herein provide sufficient information (without referencing, or with limited rotation to reference) to uniquely determine angular position in a finite and detailed manner. Such sub-region configured optical encoders enable the use of low bit depth (for each marking of a patterned signal track 606) while also providing improved position detection. That is, embodiments provided herein enable the use of low bit depth while providing the benefits of high bit depth. As will be appreciated by those of skill in the art in view of the teachings herein, there may be variations in which neither a dedicated index sensor nor an image sensor/additional line sensor is needed. In such cases, detection of position relies upon the sub-regions being unequal in angular subtense and/or the pseudorandom binary sequences not being identical in each region.

While the present disclosure has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An optical encoder comprising:
an encoder disk having a patterned signal track comprising a plurality of optically detectable elements disposed on a periphery of the encoder disk, wherein each optically detectable element is associated with a bit in a binary sequence, wherein each bit has a predefined bit depth;
a boundary dividing the patterned signal track into at least two sub-regions, wherein each sub-region comprises a subset of the optically detectable elements;
at least one sensor arranged to detect an optical signal associated with at least one optically detectable element;
a controller in communication with the at least one sensor, the controller configured to determine an angular position of the encoder disk, wherein the controller determines the angular position based on a detected binary sequence, a detected sub-region, and a look-up-table; and
an index track arranged on the encoder disk, wherein the index track enables detection of a specific sub-region.

2. The optical encoder of claim 1, wherein the encoder disk comprises a plurality of boundaries defining a plurality of sub-regions of equal arc-length such that an equal number of optically detectable elements is located in each sub-region.

3. The optical encoder of claim 1, wherein the encoder disk comprises a plurality of boundaries defining a plurality of sub-regions, such that at least two of the sub-regions have different arc-lengths.

4. The optical encoder of claim 1, wherein each sub-region comprises an identical set of optically detectable elements.

5. The optical encoder of claim 1, wherein the boundary is identifiable by the at least one sensor to indicate a sub-region.

6. The optical encoder of claim 1, wherein the at least one sensor comprises a first sensor configured to detect an optically detectable element of the patterned signal track and a second sensor configured to detect a sub-region.

7. The optical encoder of claim 1, wherein the predefined bit depth is at least 5 bits.

8. The optical encoder of claim 1, wherein the optically detectable elements of the patterned signal track are tangentially-patterned pseudorandom binary sequences.

9. A method of determining rotational movement, the method comprising:
rotating an encoder disk having a patterned signal track comprising a plurality of optically detectable elements disposed on a periphery of the encoder disk, wherein each optically detectable element is associated with a bit in a binary sequence, wherein each bit has a predefined bit depth, the encoder disk further having a boundary dividing the patterned signal track into at least two sub-regions, wherein each sub-region comprises a subset of the optically detectable elements and a plurality of radial markings, wherein a radial marking identifies a specific sub-region;
detecting a sub-region of the rotating encoder disk;
detecting an optical signal associated with at least one optically detectable element of the patterned signal track; and
determining, using a controller, an angular position of the encoder disk based on a detected binary sequence, a detected sub-region, and a look-up-table.

10. The method of claim 9, further comprising:
illuminating the encoder disk with light; and
detecting the light diffracted, as patterned by at least one of selective transmission, reflection, or diffractive phenomena, with a sensor to determine the sub-region and the optical signal associated with at least one optically detectable element of the patterned signal track.

11. The method of claim 9, wherein the encoder disk comprises a plurality of boundaries defining a plurality of sub-regions of equal arc-length such that an equal number of optically detectable elements is located in each sub-region.

12. The method of claim 9, wherein each sub-region comprises an identical set of optically detectable elements.

13. The method of claim 9, wherein the predefined bit depth is at least 5 bits.

14. An optical encoder comprising:
an encoder disk having a patterned signal track comprising a plurality of optically detectable elements disposed on a periphery of the encoder disk, wherein each optically detectable element is associated with a bit in a binary sequence, wherein each bit has a predefined bit depth;
a boundary dividing the patterned signal track into at least two sub-regions, wherein each sub-region comprises a subset of the optically detectable elements;
at least one sensor arranged to detect an optical signal associated with at least one optically detectable element; and
a controller in communication with the at least one sensor, the controller configured to determine an angular position of the encoder disk, wherein the controller determines the angular position based on a detected binary sequence, a detected sub-region, and a look-up-table,
wherein the encoder disk comprises a plurality of boundaries defining a plurality of sub-regions, such that at least two of the sub-regions have different arc-lengths.

15. An optical encoder comprising:
an encoder disk having a patterned signal track comprising a plurality of optically detectable elements disposed on a periphery of the encoder disk, wherein each optically detectable element is associated with a bit in a binary sequence, wherein each bit has a predefined bit depth;
a boundary dividing the patterned signal track into at least two sub-regions, wherein each sub-region comprises a subset of the optically detectable elements;
at least one sensor arranged to detect an optical signal associated with at least one optically detectable element; and
a controller in communication with the at least one sensor, the controller configured to determine an angular position of the encoder disk, wherein the controller determines the angular position based on a detected binary sequence, a detected sub-region, and a look-up-table,
wherein the at least one sensor comprises a first sensor configured to detect an optically detectable element of the patterned signal track and a second sensor configured to detect a sub-region.

16. The optical encoder of claim 15, wherein the first sensor is a linear sensor and the second sensor is an optical sensor.

17. An optical encoder comprising:
an encoder disk having a patterned signal track comprising a plurality of optically detectable elements disposed on a periphery of the encoder disk, wherein each optically detectable element is associated with a bit in a binary sequence, wherein each bit has a predefined bit depth;
a boundary dividing the patterned signal track into at least two sub-regions, wherein each sub-region comprises a subset of the optically detectable elements;
at least one sensor arranged to detect an optical signal associated with at least one optically detectable element;
a controller in communication with the at least one sensor, the controller configured to determine an angular position of the encoder disk, wherein the controller determines the angular position based on a detected binary sequence, a detected sub-region, and a look-up-table; and
a plurality of radial markings, wherein a radial marking identifies a specific sub-region.

18. The optical encoder of claim 17, wherein the radial markings are superimposed on the patterned signal track.

19. The optical encoder of claim 17, wherein each radial marking associated with a specific sub-region is different from the other radial markings.

20. A method of determining rotational movement, the method comprising:
rotating an encoder disk having a patterned signal track comprising a plurality of optically detectable elements disposed on a periphery of the encoder disk, wherein each optically detectable element is associated with a bit in a binary sequence, wherein each bit has a predefined bit depth, the encoder disk further having a boundary dividing the patterned signal track into at least two sub-regions, wherein each sub-region comprises a subset of the optically detectable elements;
detecting a sub-region of the rotating encoder disk;
detecting an optical signal associated with at least one optically detectable element of the patterned signal track; and
determining, using a controller, an angular position of the encoder disk based on a detected binary sequence, a detected sub-region, and a look-up-table,
wherein the encoder disk comprises a plurality of boundaries defining a plurality of sub-regions, such that at least two of the sub-regions have different arc-lengths.

* * * * *